(12) United States Patent
Li et al.

(10) Patent No.: US 9,072,987 B2
(45) Date of Patent: Jul. 7, 2015

(54) METHOD AND APPARATUS FOR DESORPTION USING A MICROPOROUS MEMBRANE OPERATED IN WETTED MODE

(71) Applicants: Shiguang Li, Mount Prospect, IL (US); Dennis Rocha, Carol Stream, IL (US); Shaojun Zhou, Palatine, IL (US); Howard Meyer, Hoffman Estates, IL (US); Benjamin Bikson, Newton, MA (US); Yong Ding, Wayland, MA (US)

(72) Inventors: Shiguang Li, Mount Prospect, IL (US); Dennis Rocha, Carol Stream, IL (US); Shaojun Zhou, Palatine, IL (US); Howard Meyer, Hoffman Estates, IL (US); Benjamin Bikson, Newton, MA (US); Yong Ding, Wayland, MA (US)

(73) Assignee: Gas Technology Institute, Des Plaines, IL (US)

( * ) Notice: Subject to any disclaimer, the term of this patent is extended or adjusted under 35 U.S.C. 154(b) by 75 days.

(21) Appl. No.: 13/837,671

(22) Filed: Mar. 15, 2013

(65) Prior Publication Data

US 2014/0260968 A1     Sep. 18, 2014

(51) Int. Cl.
*B01D 19/00*       (2006.01)
*B01D 53/22*       (2006.01)
*B01D 71/52*       (2006.01)
*B01D 53/14*       (2006.01)
B01D 69/08       (2006.01)

(52) U.S. Cl.
CPC ............ *B01D 19/0031* (2013.01); *B01D 69/08* (2013.01); *B01D 71/52* (2013.01); *B01D 53/1425* (2013.01); B01D 53/1475 (2013.01); B01D 2257/504 (2013.01)

(58) Field of Classification Search
CPC ........... B01D 19/0031; B01D 53/1425; B01D 53/22; B01D 53/228; B01D 69/08; B01D 71/52; B01D 2257/504; B01D 53/1475
USPC .................... 95/46, 51, 156, 236; 96/6, 8, 10
See application file for complete search history.

(56) References Cited

U.S. PATENT DOCUMENTS

| | | | |
|---|---|---|---|
| 5,100,555 A | 3/1992 | Matson | |
| 6,228,145 B1 * | 5/2001 | Falk-Pedersen et al. | 95/51 |
| 6,228,146 B1 * | 5/2001 | Kuespert | 95/46 |
| 8,142,546 B2 * | 3/2012 | Ogihara et al. | 95/46 |
| 8,197,578 B2 * | 6/2012 | Hruby et al. | 96/6 |
| 2007/0214957 A1 * | 9/2007 | Feron et al. | 95/46 |
| 2008/0142441 A1 | 6/2008 | Pashley | |
| 2014/0096682 A1 * | 4/2014 | Aichele et al. | 95/156 |

OTHER PUBLICATIONS

Khaisri, S. et al., "CO2 Stripping From Monoethanolamine Using a Membrane Contactor", Jnl of Membrane Science, Jul. 2011, v. 376, pp. 110-118.
Kumazawa, H., "Absorption and Desportion of CO2 by Aqueous Solutions of Sterically Hindered 2-Amino-2-Methyl-1-Propanol in Hydrophobic Microporous Hollow Fiber Contained Contactors", Chem. Eng. Communications, 2000, v. 184:1, pp. 163-179.

(Continued)

*Primary Examiner* — Jason M Greene
(74) *Attorney, Agent, or Firm* — Pauley Petersen & Erickson

(57) ABSTRACT

A method for desorption of one or more gases from a liquid stream in which a liquid stream containing at least one gas is provided to the feed side of a porous membrane and a trans-membrane pressure drop from the feed side to the opposite gas side of the membrane is created, resulting in a portion of the liquid stream filling at least a portion of the pores of the porous membrane and desorption of at least a portion of the at least one gas from the liquid stream to the gas side of the porous membrane.

9 Claims, 3 Drawing Sheets

(56) References Cited

OTHER PUBLICATIONS

Trusov, A. et al., "Gas/Liquid Membrane Contactors Based on Disubstituted Poly Acetylene for CO2 Absorption Liquid Regeneration at High Pressure and Temperature", Jnl of Membrane Science, Nov. 2011, v. 383, pp. 241-249.
Brunetti, A., et al., "Membrane Technologies for CO2 Separation", Jnl of Membrane Science, 2010, v. 359, pp. 115-125.
Dept of Energy, "Efficient Regeneration of Physical and Chemical Solvents for CO2 Capture", http://www.netl.doe.gov/File%20Library/research/coal/carbon-storage/infrastructure/FE0002196.pdf, May 2010.
Dindore, V.Y., "Gas Purification Using Membrane Gas Absorption Processes", Thesis, Universiteit Twente, Netherlands, Nov. 19, 2003.
Dortmundt, D., et al., "Recent Developments in CO2 Removal Membrane Technology", UOP, LLC, 1999, Des Plaines, Illinois.
Hoff, K.A., "Modeling and Experimental Study of Carbon Dioxide Absorption in a Membrane Contactor", Thesis, Norwegian University of Science and Technology; Dept. of Chem. Eng., Mar. 2003.
Hussain, A., et al., "A feasibility study of CO2 capture from flue gas by a facilitated transport membrane", Jnl of Membrane Science, 2010, v. 359, pp. 140-148.
Keshavarz, P., et al., "Analysis of CO2 separation and simulation of a partially wetted hollow fiber membrane contactor", Jnl of Hazardous Materials, 2008, v.152, pp. 1237-1247.
Kovvali, A.S., et al., "Immobilized Liquid Membranes for CO2 Separation", http://web.anl.gov/PCS/acsfuel/preprint%20archive/Files/45_4_WASHINGTON%20DC_08-00_0665.pdf.
Meinema, H.A., et al., "Ceramic Membranes for Gas Separation—Recent Developments and State of the Art", Interceram, 2005, v. 54, pp. 86-91.
Reed, B.W. et al, "Membrane Separations Technology: Principles and Applications Chapter 10: Membrane Contactors", Elsevier Science B.V., 1995, p. 478.

* cited by examiner

METHOD AND APPARATUS FOR DESORPTION USING A MICROPOROUS MEMBRANE OPERATED IN WETTED MODE

BACKGROUND OF THE INVENTION

1. Field of the Invention

This invention relates to a method and apparatus for solvent regeneration. In one aspect, this invention relates to membranes for solvent regeneration. In one aspect, this invention relates to $CO_2$ stripping from $CO_2$-loaded solvents.

2. Description of Related Art

Numerous chemical processes, energy conversion processes, and energy utilization processes produce fluid streams containing acid gases, such as $CO_2$, $H_2S$, $SO_2$, $CS_2$, HCN, and COS. These fluid streams may be gas streams such as natural gas, refinery gas, synthesis gas, flue gas, or reaction gas formed in the processing of waste materials comprising organic substances. Removal of the acid gases is typically required to meet environmental emissions regulations, to protect downstream catalysts for chemical processing applications, or to meet the requirements of other downstream processes and may be achieved by a variety of conventional technologies and methods.

Current processes for removing these gases include countercurrent absorption with a regenerative solvent in an absorber column in which acid-gas-rich solvent from the absorber bottom is stripped of its acid gas by applying heat through reboiling. In this process, a variety of chemical solvents including primary, secondary and tertiary amines and potassium carbonate as well as physical solvents that have a high affinity for acid gas such as methanol, N-methylpyrrolidone, propylene carbonate, and tributyl phosphate are used.

Carbon capture and storage technologies offer great potential for reducing $CO_2$ emissions and, in turn, mitigating global climate change without adversely influencing energy use or hindering economic growth. $CO_2$ capture and sequestration is increasingly becoming a supporting technology component of clean coal projects, such as coal gasification facilities, to reduce the overall environmental impact of coal utilization.

Membranes suitable for use in $CO_2$ capture applications are known to those skilled in the art. The membrane properties affecting the separation process include, but are not limited to, membrane material, composition, thickness, density, hydrophilicity, hydrophobicity, porosity, pore size, and pressure drop through the membrane.

The membranes may be polymeric-based, inorganic-based, porous, nonporous, supported or unsupported, depending upon the particular application. In the scientific literature, facilitated transport membranes, such as an immobilized liquid membrane, that is, a supported liquid membrane in which a low-vapor pressure liquid is immobilized in a porous substrate, have also been reported. The advantages of facilitated transport membranes over conventional polymeric membranes include higher permeabilities for reacting species like $CO_2$ and the resultant high selectivities over non-reacting species like $N_2$. This is due to the facilitating reaction mechanism in facilitated transport membranes compared to the solution-diffusion mechanism in polymeric membranes. Facilitated transport membranes are particularly attractive at low reacting species concentrations where the driving force is very low, and are especially beneficial for removing low concentrations of $CO_2$. However, commercialization of immobilized liquid membranes has been limited due to the inherent limitation of stability of the liquid membrane caused by the absence of any chemical bonding to support the matrix, evaporation of the solvent liquid into gas phases during operation, and lower breakthrough pressures.

In the United States, about 40% of all $CO_2$ emissions are produced by electric generating power plants. Existing coal-fired power plants account for about 85% of the total $CO_2$ emitted by all power plants. The membrane requirements for $CO_2$ separation from post-combustion flue gas may be different from $CO_2$ removal from a gaseous stream containing one or more acid gases because flue gas is hot, dilute in $CO_2$ content, near atmospheric pressure, high in volume, and often contaminated with other impurities ($O_2$, $SO_x$, $NO_x$, and ash). The conventional gas separation membrane process operates by a solution/diffusion mechanism, and the separation driving force is provided by the partial pressure difference of each component across the membrane. This process requires either flue gas compression, permeate sweep, application of permeate side vacuum, or a combination of these steps to provide the separation driving force required. Elaborate process design and optimization become prerequisite for conventional membrane processes in $CO_2$ capture from flue gases. The main limitation of conventional membrane processes is the process pressure ratio (feed gas pressure/permeate gas pressure) limitation. When the membrane separation process is pressure ratio limited, the product $CO_2$ concentration will be limited even when the membrane selectivity is much larger than the pressure ratio. Thus, multiple membrane stages are required to generate greater than 95% pure $CO_2$ product from flue gases using the conventional membrane process.

The membrane contactor process (also known as hybrid membrane/absorption process) combines advantageous features of both absorption and membrane processes to provide a cost-effective solution for $CO_2$ capture from flue gases. In this process, $CO_2$-containing gas passes through one side of the membrane while a $CO_2$ selective solvent (typically an amine solution) flows on the other side. $CO_2$ permeates through the membrane and is absorbed in the solvent. The $CO_2$ rich solvent is then regenerated and again fed to the membrane absorber.

Conventionally, the solvent regeneration is achieved a desorption tower with columns. The stripper unit usually operates at slightly above atmospheric pressure and high temperature. The specific surface area per volume for conventional columns are usually between 3.0 and 500 $m^2/m^3$ (free dispersion columns: ~3.0-35 $m^2/m^3$, packed and tray columns: 30-300 $m^2/m^3$, mechanically agitated columns: ~160-500 $m^2/m^3$). In contrast, a membrane module can provide a specific surface area per volume as high as ~1,000-9,000 $m^2/m^3$, which is up to two orders of magnitude greater than conventional contactors. Therefore, another approach for regenerating the $CO_2$ rich solvent is to use a membrane desorption module operated in a reverse mode to membrane absorption.

Compared to the extensive studies on $CO_2$ absorption, there are relatively scarce literature information on the development of $CO_2$ stripping (desorption) despite the fact that the stripping unit is responsible for the main operational cost of the absorption/desorption process. Lack of such studies in the literature is mainly due to poor thermal and chemical stabilities of commercial available membranes or/and their low mass transfer coefficient at solvent regeneration conditions.

Studies related to membrane desorption reported in the scientific literature have used non-porous (dense) polymeric membranes. In this case, the $CO_2$ desorbs from the solvent on one side of the membrane, diffuses through the polymeric layer and then passes through the porous support for recovery on the other side of the membrane. Kumazawa [Chem. Eng. Commun. 182 (2000) 163-179] investigated $CO_2$ desorption from $CO_2$ loaded 2-amino-2-methyl-1-propanol solution using the membrane desorption process. Non-porous Polytetrafluoroethylene (PTFE) hollow fiber membranes were used in the experiments. Khaisri et al. [Journal of Membrane Science 376 (2011) 110-118] conducted membrane contactor based $CO_2$ stripping from $CO_2$ loaded monoethanolamine solution also using non-porous PTFE hollow fiber membranes. Trusov et al. [Journal of Membrane Science 383 (2011) 241-249] used hydrophobic dense glassy polymers with an excess of free volume fraction, such as poly[1-(trimethylsylil)-1-propyne] (PTMSP), poly[1-(trimethylgermil)-1-propyne] (PTMGP) and poly[4-methyl-2-pentyne] (PMP) in the membrane contactor for the regeneration of physical and chemical solvents in acid gas removal processes.

There appears to be no disclosed information of using porous membranes operated in a "wetted" mode (at least a portion of the membrane pores are filled by liquid feed) for solvent regeneration in the scientific literature. According to conventional membrane contractor theory, care must be taken to prevent the solvent from entering the pores of the porous support because a stagnant liquid film in the pores of the membrane effectively blocks the passage of $CO_2$ through the porous support. This can be accomplished by maintaining the pressure on the feed side of the membrane sufficiently low and the pressure on the permeate side of the membrane sufficiently high so as to prevent the incursion of the liquid solvent into the pores of the porous membrane. Additionally, for those instances in which the $CO_2$-rich solvent may be water, incursion of the water into the porous membrane may be prevented by incorporating hydrophobic properties into the membrane design.

SUMMARY OF THE INVENTION

It is one object of this invention to provide a method and apparatus for solvent regeneration which may reduce the size of conventional solvent regeneration systems by as much as 90%, which not only reduces the capital costs for solvent regeneration, but also the installation on congested sites, on floating platforms for gas processing, and operating costs.

This and other objects of this invention may be addressed by a method for desorption of one or more gases from a liquid stream in which a liquid stream that has absorbed at least one gas is provided to the feed side, also referred to herein as the liquid side, of a hydrophilic or hydrophobic porous membrane having a liquid side and an opposite gas side with a trans-membrane pressure drop from the liquid side to the gas side of the membrane, resulting in a portion of the liquid stream filling at least a portion of the pores of the porous membrane and desorption of at least a portion of the at least one gas from the liquid stream to the gas side of the porous membrane. In accordance with one particularly preferred embodiment, the at least one gas is $CO_2$. In contrast to immobilized liquid membranes in which the liquid inside the porous structure is different from the feed liquid, i.e. the $CO_2$-rich solvent, the liquid disposed in the porous membrane of this invention is the feed liquid itself.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
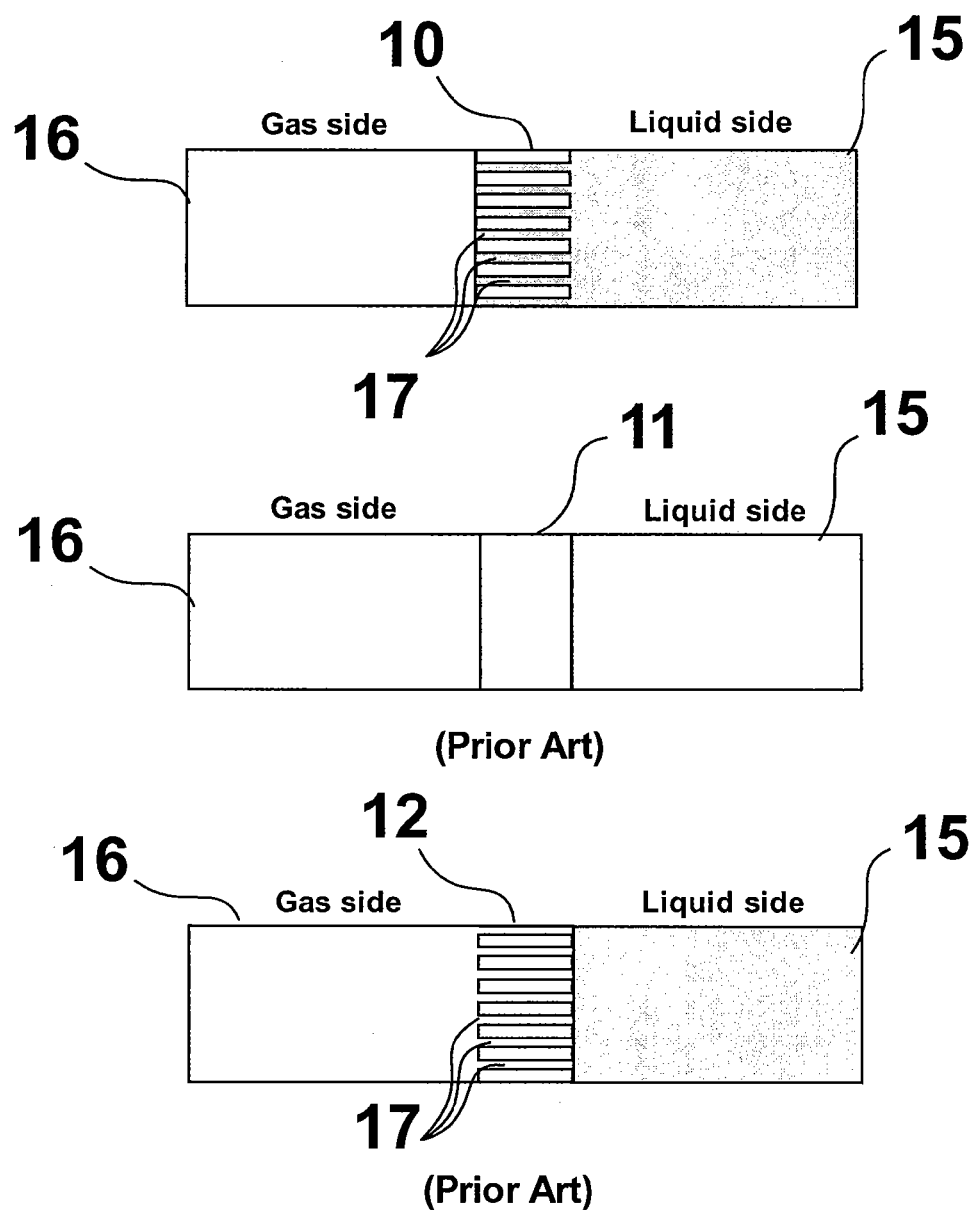
FIG. 1 is a diagram showing a membrane desorber during the process of this invention compared with conventional membrane contactor processes.

The invention described and claimed herein is a method for regenerating a gas-rich solvent employing a membrane desorption apparatus. In accordance with one preferred embodiment, the solvent to be regenerated is a $CO_2$-rich solvent. The membrane desorption apparatus comprises a porous membrane which is operated in a "wetted" mode, by which we mean that the pores of the membrane are filled by a portion of the gas-rich solvent. To enhance desorption performance, the gas-rich solvent is pressurized, creating a pressure differential between the liquid (solvent) and gas sides of the membrane, referred to herein as a trans-membrane pressure drop. The apparatus employed in the method of this invention may be referred to as a "membrane contactor"; however, it is different from conventional membrane contactors which employ either dense membranes or hydrophobic microporous membranes under non-wetting conditions. FIG. 1 shows a comparison between a membrane 10 operating in a wetted mode in accordance with the method of this invention and membranes 11, 12 for two conventional membrane contactors operating in accordance with conventional methods. As shown therein, each of the membranes has a liquid or feed side 15 and a gas or permeate side 16. In addition, membrane 11 is a dense, i.e. non-porous, membrane and membrane 12 is a hydrophobic, microporous membrane. With membrane 10 operating in accordance with the method of this invention, the liquid from the feed side of the membrane fills the pores 17. In contrast thereto, with membrane 11 operating in accordance with a conventional method, the liquid remains on the feed side of the membrane and the gas remains on the permeate side of the membrane; and with membrane 12 operating in accordance with a conventional method, the membrane pores 17 are filled by the gas on the gas side of the membrane while the liquid remains entirely on the feed side of the membrane. That is, the membrane is operated under non-wetting conditions.

The membrane desorber employed in the method of this invention is used for desorption of one or more gases from a liquid stream. In accordance with one embodiment of this invention, the membrane desorber is used for $CO_2$ stripping from $CO_2$-laden solvents enhanced by trans-membrane pressure drops at elevated temperatures under wetted mode. In accordance with one preferred embodiment of this invention, the membrane desorber comprises a nano-porous polyether ether ketone (PEEK), hollow fiber membrane for $CO_2$ stripping from $CO_2$-laden solvents enhanced by trans-membrane pressure drops at elevated temperatures under wetted mode.

Figure 2:
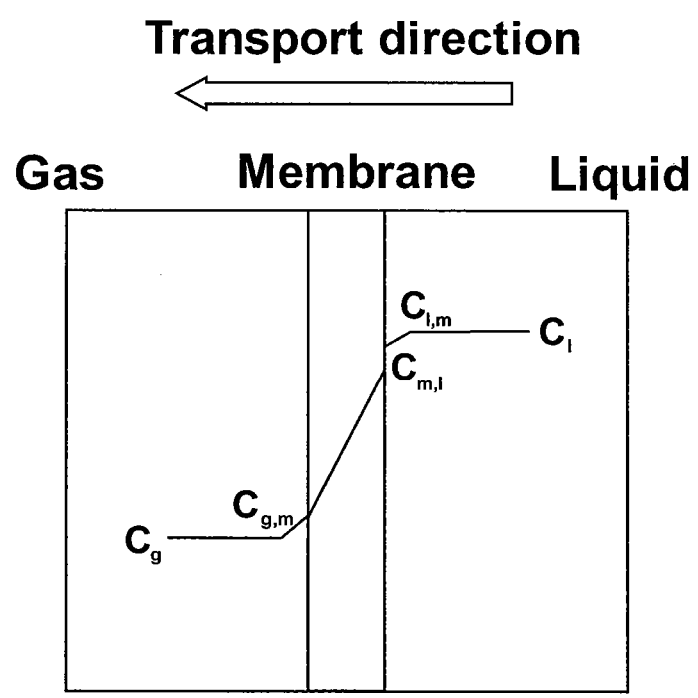
FIG. 2 is a diagram showing a gas concentration profile in a membrane desorber in accordance with one embodiment of this invention.

The transport of gas through a membrane desorber in accordance with the method of this invention is shown in FIG. 2. $C_l$, $C_{l,m}$, $C_{m,l}$, $C_{g,m}$, and $C_g$ are the gas concentrations in the liquid, at the liquid-membrane interface, at the membrane-liquid interface, at the gas-membrane interface, and in the gas phase, respectively. The overall transport of a gas in the liquid-gas desorption process includes resistances in the liquid phase, in the membrane, and in the gas phase. The resistance in the gas phase is typically very small and the resistance in the liquid phase is a function of membrane module design, i.e., flow dynamics, and solvent characteristics, i.e., temperature and viscosity. During solvent regeneration or degas processes, the liquid is heated to a temperature sufficient to enable the gases to chemically or physically desorb from the solvent. Once these conditions are set, the resistance in the membrane phase becomes critical to minimize the overall resistance.

Example 1

In this example, $CO_2$-loaded activated methyldiethanolamine (aMDEA) solvent was regenerated using a membrane desorber equipped with hydrophilic nano-porous PEEK hollow fiber membranes. In this process, the $CO_2$-rich solvent was heated and fed to the tube side of the fibers, i.e. into the lumen of the fibers. The tube side was maintained at a higher pressure than the shell side, i.e., the exterior of the fibers. As the rich solvent flowed through the tube side of the membrane, desorbed $CO_2$ permeated through the membrane and was collected at the top of the shell side, and the lean ($CO_2$-depleted) solvent was collected at the distal bottom end of the tube side. During the testing, some lean solvent was also collected at the bottom of the shell side, indicating that the liquid had permeated from the tube side to the shell side as well, and the membrane was wetted during the operation. Table 1 shows the membrane contactor regeneration performance through the module with the gas side pressure at about 0 psig (close to atmospheric pressure). The results are shown for a temperature of about 87° C. and different trans-membrane pressure drops. As can be seen, the $CO_2$ stripping rate through the membrane increases with increasing trans-membrane pressure drop.

TABLE 1

Membrane contactor regeneration performance

| Average trans-membrane pressure drop (psi) | $CO_2$ stripping rate through the membrane (kg/min/m$^2$) |
|---|---|
| 11 | 0.2 |
| 25 | 0.3 |
| 34 | 0.5 |
| 47 | 0.7 |

Example 2

Figure 3:
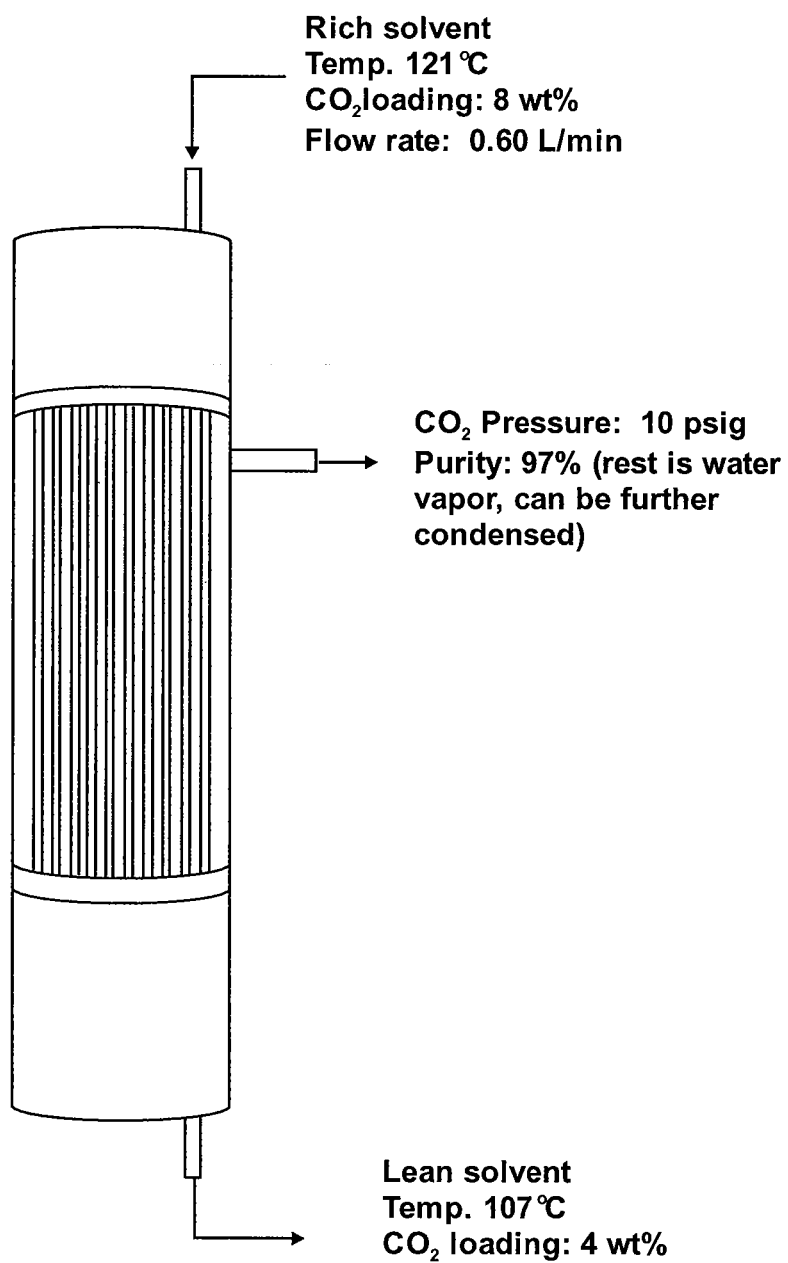
FIG. 3 is a diagram showing flow configuration and performance for a membrane desorber using nano-porous hydrophilic membranes in accordance with one embodiment of this invention.

[1] In this example, $CO_2$-loaded activated methyldiethanolamine (aMDEA) solvent was regenerated using a membrane desorber equipped with hydrophilic nano-porous PEEK hollow fiber membranes, the same membrane as in the previous example, but at a higher regeneration temperature and a higher trans-membrane pressure drop. The flow configuration and operating conditions are shown in FIG. 3. At a trans-membrane pressure drop of 75 psi, i.e. feed liquid in tube side at 85 psig and shell side at 10 psig, and an average temperature of 114° C. ((121+107)/2=114), the $CO_2$ stripping rate was as high as 4.1 kg/m$^2$/hr. The higher feed liquid side pressures forces the liquid into the pores of the membrane. Contrary to conventional wisdom, the wetted membrane showed a higher mass transfer rate for solvent desorption than would be expected.

[2] In membrane processes, permeance, typically defined in GPU (1 GPU=$10^{-6}$ cm$^3$ (STP)/(cm$^2$·s·cmHg)), is used to describe pressure normalized flux, a measure of the rate at which gases pass through the membrane. The membrane intrinsic permeance for $CO_2$ through this membrane module was about 400 GPU at 114° C. At the experimental condition, the trans-membrane partial pressure drop for $CO_2$ simulated by ASPEN-Plus was about 66 psi. Thus, the estimated $CO_2$ flux through the membrane with pores filled by a gaseous phase would be about 10 kg/m$^2$/hr. If membrane wetting, i.e. membrane pores filled with feed liquid, caused a decrease in gas transfer of about 10,000 times as predicted by conventional wisdom, the expected $CO_2$ stripping rate would only be about 0.001 kg/m$^2$/hr. Indeed, the measured $CO_2$ stripping rate of 4.1 kg/m$^2$/hr was orders of magnitude higher than expected.

[3] While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for desorption of one or more gases that are chemically or physically absorbed in a liquid solvent comprising the steps of:
   providing a nano-porous hollow fiber membrane comprising polyether ether ketone and having a liquid tube side and an opposite gas shell side;
   providing a feed liquid stream containing the liquid solvent and at least one gas that is chemically or physically absorbed in the liquid solvent to a first end of said liquid tube side of said nano porous hollow fiber membrane;
   creating a trans-membrane pressure drop from said liquid tube side to said gas shell side of said nano-porous hollow fiber membrane, resulting in a portion of said feed liquid stream filling at least a portion of the pores of said nano-porous hollow fiber membrane and desorption of at least a portion of said at least one gas from said liquid stream to said gas side of said nano-porous hollow fiber membrane;
   collecting the liquid solvent from a second end of the liquid tube side; and
   collecting the at least a portion of the at least one gas from the gas shell side.

2. The method of claim 1, wherein said trans-membrane pressure drop is greater than about 10 psi.

3. The method of claim 1, wherein said at least one gas is $CO_2$.

4. The method of claim 1, wherein said liquid stream is heated to a temperature suitable for desorption of said at least one gas from said liquid stream.

5. The method of claim 1, wherein a desorption rate of said at least one gas from said liquid stream is greater than an absorption rate of said at least one gas by said liquid stream.

6. A method for desorption of $CO_2$ from a liquid stream comprising the steps of:
   providing a pressurized liquid stream containing a liquid solvent and $CO_2$ to a first end of a tube side of a nano-porous hollow fiber hydrophilic membrane comprising polyether ether ketone;
   filling at least a portion of said nano-porous hollow fiber hydrophilic membrane with said liquid stream; and
   desorbing at least a portion of said $CO_2$ from said liquid stream, transporting $CO_2$ through the membrane, and entering into an opposite shell side of said nano-porous hollow fiber hydrophilic membrane, said opposite shell side of said nano-porous hollow fiber hydrophilic membrane being at a lower pressure than said first side of said nano-porous hollow fiber hydrophilic membrane;

collecting the liquid solvent from a second end of the first tube side; and collecting the at least a portion of the $CO_2$ from the opposite shell side.

7. The method of claim 6, wherein a pressure drop across said porous hydrophilic membrane is greater than about 10 psi.

8. The method of claim 6, wherein said pressurized liquid stream is heated to a temperature suitable for desorption of said $CO_2$.

9. The method of claim 6, wherein a desorption rate of said $CO_2$ from said liquid stream is greater than an absorption rate of said $CO_2$ by said liquid stream.

* * * * *